US010753794B2

(12) United States Patent
Margalit et al.

(10) Patent No.: US 10,753,794 B2
(45) Date of Patent: Aug. 25, 2020

(54) CONCURRENT ACTIVATION OF MULTIPLE ILLUMINATION SOURCES FOR SAMPLE ANALYSIS

(71) Applicant: EMPIRE TECHNOLOGY DEVELOPMENT LLC, Wilmington, DE (US)

(72) Inventors: Mordehai Margalit, Zichron Ya'akov (IL); Curtis D. Moyer, Phoenix, AZ (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 15/577,416

(22) PCT Filed: May 28, 2015

(86) PCT No.: PCT/US2015/032988
§ 371 (c)(1),
(2) Date: Nov. 28, 2017

(87) PCT Pub. No.: WO2016/190884
PCT Pub. Date: Dec. 1, 2016

(65) Prior Publication Data
US 2018/0172511 A1 Jun. 21, 2018

(51) Int. Cl.
G01J 3/10 (2006.01)
G01J 3/02 (2006.01)
(Continued)

(52) U.S. Cl.
CPC .................. G01J 3/10 (2013.01); G01J 3/027 (2013.01); G01J 3/28 (2013.01); G01J 3/42 (2013.01);
(Continued)

(58) Field of Classification Search
CPC ...... G01J 3/10; G01J 3/027; G01J 3/28; G01J 3/42; G01J 3/433; G01J 3/4338;
(Continued)

(56) References Cited

U.S. PATENT DOCUMENTS 5,305,402 A 4/1994 Hill et al.
5,585,652 A 12/1996 Kamasz et al.
(Continued)

FOREIGN PATENT DOCUMENTS

WO 2009146061 A2 12/2009
WO 2013098708 A2 7/2013

OTHER PUBLICATIONS

"Modulated LED Source for FLIM Microscopy," Thorlabs, accessed at https://web.archive.org/web/20141221205855/http://www.thorlabs.us/newgrouppage9.cfm?objectgroup_id=3459, archived at Dec. 21, 2014, accessed on Nov. 23, 2017, pp. 2.
(Continued)

Primary Examiner — Christine S. Kim

(57) ABSTRACT

Technologies are generally described for concurrent activation of multiple illumination sources to analyze a sample. A controller may be configured to activate the illumination sources substantially simultaneously, where a current or voltage of each activated illumination source is modulated at a different frequency by respective circuit drivers of the controller. Each activated illumination source may be configured to illuminate the sample with light at a different emission wavelength, and one or more detectors may be configured to detect a composite signal from the sample in response to the illumination. The composite signal may include multiple returned signals, where each returned signal corresponds to light emitted from one of the activated illumination sources at a respective emission wavelength. One or more filters, each associated with a respective modulation frequency of one activated illumination source,
(Continued)

may be configured to extract each returned signal from the composite signal for analysis.

23 Claims, 11 Drawing Sheets

(51) Int. Cl.
  *G01J 3/42* (2006.01)
  *G01J 3/433* (2006.01)
  *G01J 3/28* (2006.01)
  *G01N 21/64* (2006.01)
  *G01J 3/12* (2006.01)
  *G01J 1/42* (2006.01)

(52) U.S. Cl.
  CPC ............ *G01J 3/433* (2013.01); *G01J 3/4338* (2013.01); *G01N 21/645* (2013.01); *G01J 2001/4242* (2013.01); *G01J 2003/1213* (2013.01); *G01J 2003/2866* (2013.01); *G01N 2021/6463* (2013.01)

(58) Field of Classification Search
  CPC ....... G01J 2001/4242; G01J 2003/1213; G01J 2003/2866; G01N 21/645; G01N 2021/6463
  See application file for complete search history.

(56) References Cited

U.S. PATENT DOCUMENTS

| | | | |
|---|---|---|---|
| 5,784,098 A * | 7/1998 | Shoji | G01B 11/25 348/139 |
| 6,122,042 A | 9/2000 | Wunderman et al. | |
| 6,363,269 B1 | 3/2002 | Hanna et al. | |
| 6,426,505 B1 | 7/2002 | Rao et al. | |
| 6,512,384 B1 * | 1/2003 | Lagowski | G01R 31/2648 324/754.23 |
| 6,985,224 B2 | 1/2006 | Hart | |
| 7,265,571 B2 * | 9/2007 | Srocka | G01R 31/2656 324/754.23 |
| 8,285,510 B2 | 10/2012 | Schowengerdt et al. | |
| 8,390,205 B2 | 3/2013 | Li et al. | |
| 8,552,659 B2 * | 10/2013 | Ashdown | H05B 33/0869 315/291 |
| 8,596,815 B2 | 12/2013 | Lee et al. | |
| 9,658,160 B2 * | 5/2017 | Jaffe | H05B 45/22 |
| 2003/0205682 A1 | 11/2003 | Kapoor et al. | |
| 2007/0090751 A1 | 4/2007 | Cok et al. | |
| 2007/0108392 A1 | 5/2007 | Ross | |
| 2007/0225582 A1 * | 9/2007 | Diab | A61B 5/14551 600/336 |
| 2009/0187925 A1 | 7/2009 | Hu et al. | |
| 2009/0189530 A1 | 7/2009 | Ashdown et al. | |
| 2010/0016732 A1 | 1/2010 | Wells et al. | |
| 2017/0059408 A1 * | 3/2017 | Korner | G01B 11/2536 |

OTHER PUBLICATIONS

"Remote control," Wikipedia, accessed at https://web.archive.org/web/20150523114935/http://en.wikipedia.org/wiki/Remote_control, last modified on May 6, 2015, pp. 10.

Bajic, J.S. et al., "The frequency-modulated reflective color sensor," Proceedings of the 35th International Convention MIPRO, 2012, pp. 162-166 (May 21-25, 2012).

Dixit, R., et al., "Simultaneous Single Detector Measurement of Multiple Fluorescent Sources," IEEE Sensors Journal vol. 13, Issue No. 5, pp. 1965-1971 (Jan. 11, 2013).

International Search Report and Witten Opinion for International Application No. PCT/US2015/032988 dated Sep. 4, 2015, pp. 14.

Moyer, C.D., et al., "Frequency Division Multiplexing Using High Radiance 800 NM Light Emitting Diodes," Optical Fiber Communication Conference, Technical Digest, pp. 1052-1056 (Dec. 1984).

Yang, H., et al., "Illumination Sensing in LED Lighting Systems Based on Frequency-Division Multiplexing," IEEE Transactions on Signal Processing, vol. 57, Issue No. 11, pp. 4269-4281 (Jun. 10, 2009).

\* cited by examiner

COMPUTER PROGRAM PRODUCT 900

SIGNAL-BEARING MEDIUM 902

904 ONE OR MORE INSTRUCTIONS TO

ILLUMINATE A SAMPLE WITH LIGHT FROM A PLURALITY OF ILLUMINATION SOURCES ACTIVATED SUBSTANTIALLY SIMULTANEOUSLY BY A CONTROLLER, WHERE EACH OF THE ILLUMINATION SOURCES ARE ACTIVATED AT A DIFFERENT MODULATION FREQUENCY AND HAVE A DIFFERENT EMISSION WAVELENGTH;
DETECT A COMPOSITE SIGNAL FROM THE SAMPLE IN RESPONSE TO THE ILLUMINATION AT ONE OR MORE DETECTORS, WHERE THE COMPOSITE SIGNAL COMPRISES A PURALITY OF REFLECTED SIGNALS, EACH OF THE REFLECTED SIGNALS CORRESPONDING TO LIGHT EMITTED FROM ONE OF THE ILLUMINATION SOURCES AT A RESPECTIVE EMISSION WAVELENGTH; AND
EXTRACT THE REFLECTED SIGNALS FROM THE COMPOSITE SIGNAL AT RESPECTIVE EMISSION WAVELENGTHS OF EACH OF THE ILLUMINATION SOURCES AT ONE OR MORE FILTERS, WHERE EACH OF THE FILTERS ARE ASSOCIATED WITH A RESPECTIVE MODULATION FREQUENCY AT WHICH ONE OF THE ILLUMINATION SOURCES IS ACTIVATED.

| COMPUTER-READABLE MEDIUM 906 | RECORDABLE MEDIUM 908 | COMMUNICATIONS MEDIUM 910 |

FIG. 9

COMPUTER PROGRAM PRODUCT 1100

SIGNAL-BEARING MEDIUM 1102

1104 ONE OR MORE INSTRUCTIONS TO

DETECT A BACKGROUND ILLUMINATION SIGNAL AT ONE OR MORE DETECTORS;
DETERMINE A FREQUENCY OF THE BACKGROUND ILLUMINATION SIGNAL; AND
SELECT A RESPECTIVE MODULATION FREQUENCY AT WHICH EACH OF A PLURALITY OF ILLUMINATION SOURCES ARE TO BE ACTIVATED FOR SAMPLE ANALYSIS BASED ON THE BACKGROUND ILLUMINATION FREQUENCY SUCH THAT ACTIVATION AT THE BACKGROUND ILLUMINATION FREQUENCY IS AVOIDED WHEN ILLUMINATING THE SAMPLE.

| COMPUTER-READABLE MEDIUM 1106 | RECORDABLE MEDIUM 1108 | COMMUNICATIONS MEDIUM 1110 |

FIG. 11

CONCURRENT ACTIVATION OF MULTIPLE ILLUMINATION SOURCES FOR SAMPLE ANALYSIS

CROSS-REFERENCE TO RELATED APPLICATIONS

This Application is a U.S. National Stage filing under 35 U.S.C. § 371 of International Application No. PCT/US2015/032988, filed on May 28, 2015 and entitled "CONCURRENT ACTIVATION OF MULTIPLE ILLUMINATION SOURCES FOR SAMPLE ANALYSIS" the disclosure of which is incorporated by reference in its entirety.

BACKGROUND

Unless otherwise indicated herein, the materials described in this section are not prior art to the claims in this application and are not admitted to be prior art by inclusion in this section.

In a variety of scientific, industrial, financial, and legal activities, for example, spectroscopic information associated with a sample may need to be acquired to analyze and/or evaluate the sample. Current systems developed for such analysis may include multiple light illumination sources configured to illuminate the sample with light, and one or more detectors configured to detect returned light from the sample in response to the illumination. However, in these systems, the illumination sources are activated one at a time, for example, sequentially, to enable the returned light from the sample to be determined for each respective illumination source based on a time frame each illumination source was activated.

The sequential activation of the illumination sources may cause longer measurement times, thus increasing an acquisition time to obtain the spectroscopic information associated with the sample. Furthermore, current systems may not enable measurement of non-linear interactions between two or more wavelengths and/or time-dependent phenomena. Accordingly, the current systems could use improvements and/or alternative or additional solutions, such that measurement times may be reduced, and a wider variety of phenomena and/or interactions may be measured.

SUMMARY

The present disclosure generally describes techniques for concurrent activation of multiple illumination sources to analyze a sample.

According to some examples, an apparatus may be described herein. An example apparatus may include a plurality of illumination sources configured to illuminate a sample with light, where each of the illumination sources may have a different emission wavelength. The example apparatus may also include controller configured to activate the illumination sources substantially simultaneously, where each of the illumination sources may be configured to be activated at a different modulation frequency. The example apparatus may further include one or more detectors positioned adjacent to the plurality of illumination sources, the detectors configured to detect a composite signal from the sample in response to the illumination, where the composite signal may include a plurality of returned signals, each of the returned signals corresponding to light emitted from one of the illumination sources at a respective emission wavelength.

According to some examples, systems configured to concurrently activate multiple illumination sources for sample analysis may be described. An example system may include an imaging sub-system and an analytics sub-system. The imaging sub-system may include an illumination module configured to illuminate a sample with light from a plurality of illumination sources activated substantially simultaneously by a controller, where each of the illumination sources may be activated at a different modulation frequency and have a different emission wavelength. The imaging sub-system may also include a detection module configured to detect a composite signal from the sample in response to the illumination through one or more detectors positioned adjacent to the plurality of illumination sources, where the composite signal may include a plurality of returned signals, each of the returned signals corresponding to light emitted from one of the illumination sources at a respective emission wavelength. The imaging sub-system may further include an extraction module configured to extract the returned signals from the composite signal at respective emission wavelengths of each of the illumination sources through one or more filters, where each of the filters may be associated with a respective modulation frequency at which one of the illumination sources is activated. The analytics sub-system may include one or more processors coupled to the imaging sub-system, the processors configured to analyze each of the returned signals extracted to determine a spectral profile of the sample.

According to further examples, methods to concurrently activate multiple illumination sources for sample analysis may be provided. An example method may include illuminating a sample with light from a plurality of illumination sources activated substantially simultaneously by a controller, where each of the illumination sources may be activated at a different modulation frequency and have a different emission wavelength. The example method may also include detecting a composite signal from the sample in response to the illumination at one or more detectors positioned adjacent to the illumination sources, where the composite signal may include a plurality of returned signals, each of the returned signals corresponding to light emitted from one of the illumination sources at a respective emission wavelength. The example method may further include extracting the returned signals from the composite signal at respective emission wavelengths of each of the illumination sources at one or more filters, where each of the filters may be associated with a respective modulation frequency at which one of the illumination sources is activated, and may be coupled to each of the detectors.

According to yet further examples, methods to select modulation frequencies at which multiple illumination sources are concurrently activated for sample analysis may be provided. An example method may include detecting a background illumination signal at one or more detectors, determining a frequency of the background illumination signal, and selecting a respective modulation frequency at which each of a plurality of illumination sources are to be activated for sample analysis based on the background illumination frequency, such that activation at the background illumination frequency may be avoided when illuminating the sample.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 9 illustrates a block diagram of an example computer program product, FIG. 11 illustrates a block diagram of an example computer program product, all arranged in accordance with at least some embodiments described herein.

DETAILED DESCRIPTION

Figure 1:
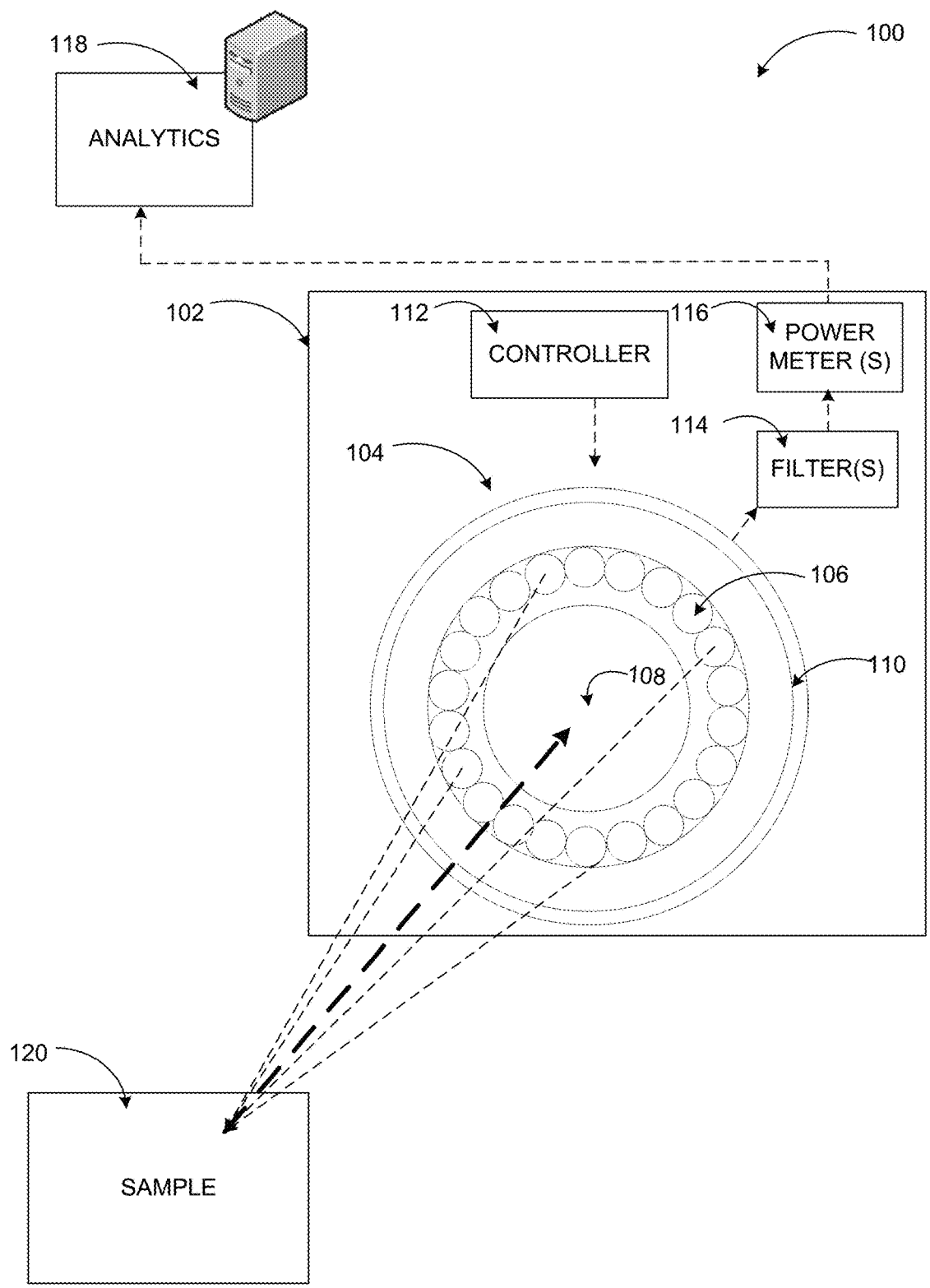
FIG. 1 illustrates an example system configured to concurrently activate multiple illumination sources to analyze a sample.

10011) In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to concurrent activation of multiple illumination sources to analyze a sample.

Briefly stated, technologies are generally described for concurrent activation of multiple illumination sources to analyze a sample. A controller may be configured to activate the illumination sources substantially simultaneously, where a current or voltage of each activated illumination source is modulated at a different frequency by respective circuit drivers of the controller. Each activated illumination source may be configured to illuminate the sample with light at a different emission wavelength, and one or more detectors may be configured to detect a composite signal from the sample in response to the illumination. The composite signal may include multiple returned signals, where each returned signal corresponds to light emitted from one of the activated illumination sources at a respective emission wavelength. One or more filters, each associated with a respective modulation frequency of one activated illumination source, may be configured to extract each returned signal from the composite signal for analysis.

FIG. 1 illustrates an example system configured to concurrently activate multiple illumination sources to analyze a sample, arranged in accordance with at least some embodiments described herein.

As shown in a diagram 100, an example system may include an imaging sub-system 102 and an analytics sub-system 118. The imaging sub-system 102 may include an imaging device 104 that includes a plurality of illumination sources 106, one or more detectors 108, and an optical element 110, such as a lens. The imaging sub-system 102 may also include a controller 112, one or more filters 114, and one or more power meters 116. The controller 112, filters 114, and power meters 116 may be integrated components of the imaging device 104, or may be separate components and/or modules of the imaging sub-system 102, as illustrated in FIG. 1. The analytics sub-system 118 may be coupled to the imaging sub-system 102, through wired or wireless means, and may include one or more processors.

In an example embodiment, the controller 112 may be configured to activate the illumination sources 106 substantially simultaneously. Activation of the illumination sources substantially simultaneously may be defined herein as the activation of two or more of the illumination sources 106 such that at least one of the illumination sources may illuminate a sample with light during a portion or an entirety of a same time period that another illumination source is illuminating the sample with light. The controller 112 may include a plurality of driver circuits, where each of the driver circuits may be configured to control a current or a voltage for a corresponding one of the illumination sources 106. Additionally, each of the driver circuits may be configured to modulate the current or the voltage at a particular frequency for the corresponding one of the illumination sources 106, such that each of the illumination sources 106 may be activated at a different modulation frequency. The current or the voltage may be modulated in a sinusoidal waveform or a non-sinusoidal waveform, for example.

In some embodiments, a respective modulation frequency at which each of the illumination sources 106 is activated may be selected based on a determined background illumination frequency. The background illumination frequency may be determined by detecting a background illumination signal at the detectors 108 prior to the illumination of the sample 120, and determining a frequency of the background illumination signal. The respective modulation frequency at which each of the illumination sources 106 is activated may then be selected such that activation at the background illumination frequency is avoided when illuminating the sample 120 in order for noise from the background illumination to be minimized and/or eliminated.

In one embodiment, the selected modulation frequencies may be positive integer multiples of the background illumination frequency. For example, a start modulation frequency for a first of the illumination sources 106 to be activated may be computed by multiplying a positive integer and the determined background illumination frequency. The background illumination frequency may be multiplied by positive integers of 1, 2, and 3, for example, to compute a start modulation frequency. However, multiplying the background illumination frequency by higher positive integer values, such as 10, 100, and 1000, may be more effective in minimizing the noise from the background illumination. The respective modulation frequencies for subsequent ones of the illumination sources 106 to be activated substantially simultaneously may be based on the start modulation frequency, and computed by formula, (start modulation frequency+n*background illumination frequency), where n is a positive integer that is different for each of the respective modulation frequencies. In some examples, a time period for illuminating the sample may also be selected based on the background illumination frequency such that background interference is minimized, where the sample illumination time is equal to a positive integer multiple of an inverse of the background illumination frequency.

In an example scenario, a background illumination frequency of 120 hertz (Hz) may be determined based on a background illumination signal detected by the detectors 108. A sample illumination time may be selected based on an inverse of the background illumination frequency, $\frac{1}{120}$ seconds (s) or approximately about 8.3 milliseconds (ms). The start modulation frequency for the first of the illumination sources 106 to be activated may be selected to be 1000 times the 120 Hz background interference, or 120 kilohertz (kHz). The respective modulation frequencies for subsequent ones of the illumination sources to be activated substantially simultaneously may be selected to be (120 kHz+n*120 Hz) where n=1, 2, 3, etc., and n is different for each of the respective modulation frequencies.

In further embodiments, the frequency of the background illumination signal may be continuously determined prior to sampling, throughout sampling, and post-sampling to determine if any modifications to the background illumination frequency occur. In response to a determination that the background illumination frequency has been modified, another respective modulation frequency at which each of the illumination sources are to be activated may be selected for a next illumination of the sample. For example, the other respective modulation frequency at which each of the illumination sources are to be activated may be selected based on the modified frequency.

Upon activation, the illumination sources 106 may be configured to illuminate at least a portion of the sample with light, where each of the illumination sources 106 has a different emission wavelength. The optical element 110 may be configured to converge incident light from the illumination sources 106 on to the sample to illuminate the sample with the light. The optical element 110 may include lenses, reflectors, and/or partial reflectors configured to reflect light, partially reflect light, or occlude light, for example.

The detectors 108 may be configured to detect a composite signal from the sample in response to the illumination. The composite signal may include a plurality of returned signals, where each of the returned signals corresponds to the light emitted from one of the illumination sources 106 at a respective emission wavelength. The returned signals may include reflected light, scattered light, and/or fluorescent light, for example. The optical element 110 may be configured to collect the returned signals from the sample in response to the illumination to facilitate detection of the composite signal by the detectors 108. In some embodiments, the composite signal may be a linear combination of the returned signals due to the activation of each of the illumination sources 106 at a different modulation frequency. In other embodiments, the composite signal may be a sum and/or difference of the returned signals if the two or more of the illumination sources 106 are participating in a non-linear interaction.

Examples of non-linear interactions may include illumination of materials with saturable optical absorption, illumination of materials with resonant structures associated with a resonance frequency that changes as a function of absorbed light, and illumination of phosphor materials, which absorb light in one frequency range and emit light in another frequency range, where a density of said phosphor materials may be low compared to the optical flux of the light. Another example of a non-linear interaction may be caused by high level illumination of materials with electron-hole pair generation. The materials may have so many electrons that the recombination of a hole and electron may transfer the resulting energy into another nearby free electron, a process called 'Auger'. In this example, as the illumination intensity is increased, the light output increases at a decreasing rate relative to the light input causing a non-linear response with a downward curvature. Non-linear responses may be approximated with higher order polynomial fits such as $y=ax^3+bx^2+cx+d$ were the a, b, c, d coefficients weight the amount of cube, square, linear and offset needed to 'fit' the response curve. If x is the light input consisting of light emitted from a first illumination source and a second illumination at a different wavelength and modulation frequency, (x=sin(wt)+sin(ut)) where t is time, w is a first frequency of light modulation and u is a second frequency of light modulation, for example, the nonlinear response may sum cube, square, and linear functions of the input light modulation to get the output. The multiplication of the input modulation frequencies of light may generate modulation output at frequencies that are sums and differences of the input frequencies. If w=10 megahertz (MHz) and u=11 MHz, the returned signals will have a 21 MHz and a 1 MHz signal coming from the square term in addition to 10 MHz and 11 MHz from the linear term. Further, the cube term will generate additional return signals at twice one frequency minus the other frequency in all possible combinations.

In an example scenario, the non-linear material being sampled may be a phosphor material with two optically excited states, enabling excited level absorption. The phosphor material may be illuminated with light by two illumination sources, where the light from each of the illumination sources may be emitted at a different emission wavelength. The wavelength of the light emitted by the first of the illumination sources may correspond to the first optically excited state of the phosphor material, and the wavelength of the light emitted by the second of the illumination sources may correspond to a difference between the second optically excited state and the first optically excited state. For example, in Erbium, a phosphor material, the first optically excited state is about 1500 nm, and a second optically excited state is about 530 nm. Accordingly, in this example scenario, the wavelength of the light emitted by the first of the illumination sources may be about 1500 nm, and the wavelength of the light emitted by the second of the illumination sources may be about 1000 nm. The absorption of the light emitted by the second of the illumination sources may be dependent on the flux of the light emitted by the first of the illumination sources. For example, when the light emitted by the first of the illumination sources is present, the phosphor material may absorb about 10% of the light emitted by the second of the illumination sources, when the light emitted by the first of the illumination sources is not present the phosphor material may absorb about 2% of the light emitted by the second of the illumination sources. As an example of use, the light emitted by the first of the illumination sources may be emitted with a modulation of f1 kHz (e.g., 100 kHz), light emitted by the second of the illumination sources may be emitted with a modulation of f2 kHz (e.g., 169 kHz). The composite signal detected by the detectors 108 may contain the following returned signals: the light emitted by the first of the illumination sources modulated at f1, and the light emitted by the second of the illumination sources modulated at 12, f1−f2, and f1+f2. An amplitude of the modulation at f1+f2 or at f1−f2 may provide an indication of the non-linear interaction.

In other embodiments, a non-linear interaction may be caused by photo luminescent centers of illumination sources having non-light emitting portions, such as defects, that are limited in number and recombination rate. At low levels of illumination, the illumination energy may generate heat through the defects instead of light to be returned back to the detectors. As the illumination intensity is increased, the defect heat generating pathway may become saturated and the light output relative to light input may increase in a super linear (e.g., upward curved) response.

The filters 114 may be coupled to the detectors 108, where each of the filters 114 may be associated with a respective modulation frequency at which one of the illumination sources 106 is activated. For example, the filters 114 may be dynamic filters, where a pass band of each of the dynamic filters may be adjusted according to the respective modulation frequency at which one of the illumination sources 106 is activated. The filters 114 may be configured to extract the returned signals from the composite signal at respective emission wavelengths of the illumination sources 106. At least one of the power meters 116 may be coupled to each of the filters 114. The power meters 116 may be configured to determine an amplitude of a spectral peak of each reflected signal that is extracted. In some examples, the amplitude of the spectral peak associated with each of the plurality of returned signals determined over an illumination time period may be individually averaged to decrease a background light interference. In a scenario involving non-linear interactions, such as the example scenario provided above, a non-linear interaction may be characterized by having a filter and a power meter at the frequencies of the sum and difference components of the returned signals (e.g., at f1−f2, and f1+f2).

In other embodiments, one or more demodulators may be configured to extract each of the returned signals from the composite signal at respective emission wavelengths of the illumination sources 106. In further embodiments, analog-to-digital conversion (ADC) and digital signal processing (DSP) may be employed to extract each of the returned signals from the composite signal at respective emission wavelengths of the illumination sources 106. In some examples, phase-locked detection of a returned signal arising from illumination by a light source may be used, e.g. phase locked to the activation of the light source.

The processors of the analytics sub-system 118 may be configured to analyze each of the returned signals to determine a spectral profile of the sample 120, where the spectral profile may be based on the amplitude of the spectral peak of each reflected signal. In some embodiments, one or more characteristics of the sample 120 may be evaluated based on the spectral profile. For example, the spectral profile of the sample 120 may be compared to a reference sample.

As previously discussed, current systems for sample analysis may be limited to activating one illumination source at a time. Concurrent activation of the illumination sources 106 at different modulation frequencies, as described herein, may drastically reduce an acquisition time for sample analysis. For example, if the imaging sub-system comprises 30 illumination sources, the concurrent activation of the 30 illumination sources will reduce the acquisition time by a factor of 30 from current system acquisition time. Additionally, concurrent activation of the illumination sources 106 at different modulation frequencies may enable effective sampling of non-linear, wavelength dependent absorbing material, and identification and measurement of non-linear optical phenomena or time-dependent phenomena.

To provide a first example, if the sample 120 is a non-linear, wavelength dependent absorbing material, the sample 120 may exhibit a non-linear response as a function of an intensity of the illumination sources. As such, it is pertinent to ensure that the non-linear response is from the sample and not a measurement system detecting the response. Due to the concurrent activation of the illumination sources, each at a different emission wavelength, the emission wavelength behavior may be analyzed to verify if any non-linearity is wavelength dependent.

To provide a second example, multi photon non-linear optical phenomena, such as two photon absorption, may require two or more different illumination sources to sample. Due to the concurrent activation of the illumination sources, the light emitted to illuminate the sample will be a multiplication of the two or more different illumination sources, and the composite signal detected will be a multiplication of all returned signals corresponding to the light emitted from the two or more different illumination sources. Since each of the illumination sources may be modulated at a different frequency in a sinusoidal waveform, the resulting signal will oscillate at sum or differences of the different modulation frequencies.

To provide a third example, time-delayed phenomena, such as fluorescence, may be measured. By activating each of the illumination sources at a different modulation frequency, where the different modulation frequencies are sinusoidal, a phase difference between the emitted light and the composite signal may be measured. Additionally, a phase difference between multiple signals within the composite signal may be identified. For example, the reflected light signal may arrive after a few nanoseconds, while the fluorescence light signal may arrive after a decay time of the excited states, which may be milliseconds. The proposed modulation may enable the reflected light and fluorescent light to be distinguished, and an amount of the fluorescent light, as well as the decay time to be measured. As described above, a plurality of illumination sources may each be activated at multiple different modulation frequencies simultaneously to obtain the fluorescent frequency (time) response of a sample, where the frequency response is obtained at the modulation frequencies simultaneously. Alternatively, a single illumination source may be activated at multiple different modulation frequencies to get the frequency response of a sample quickly for a single color stimulation, for example.

Figure 2:
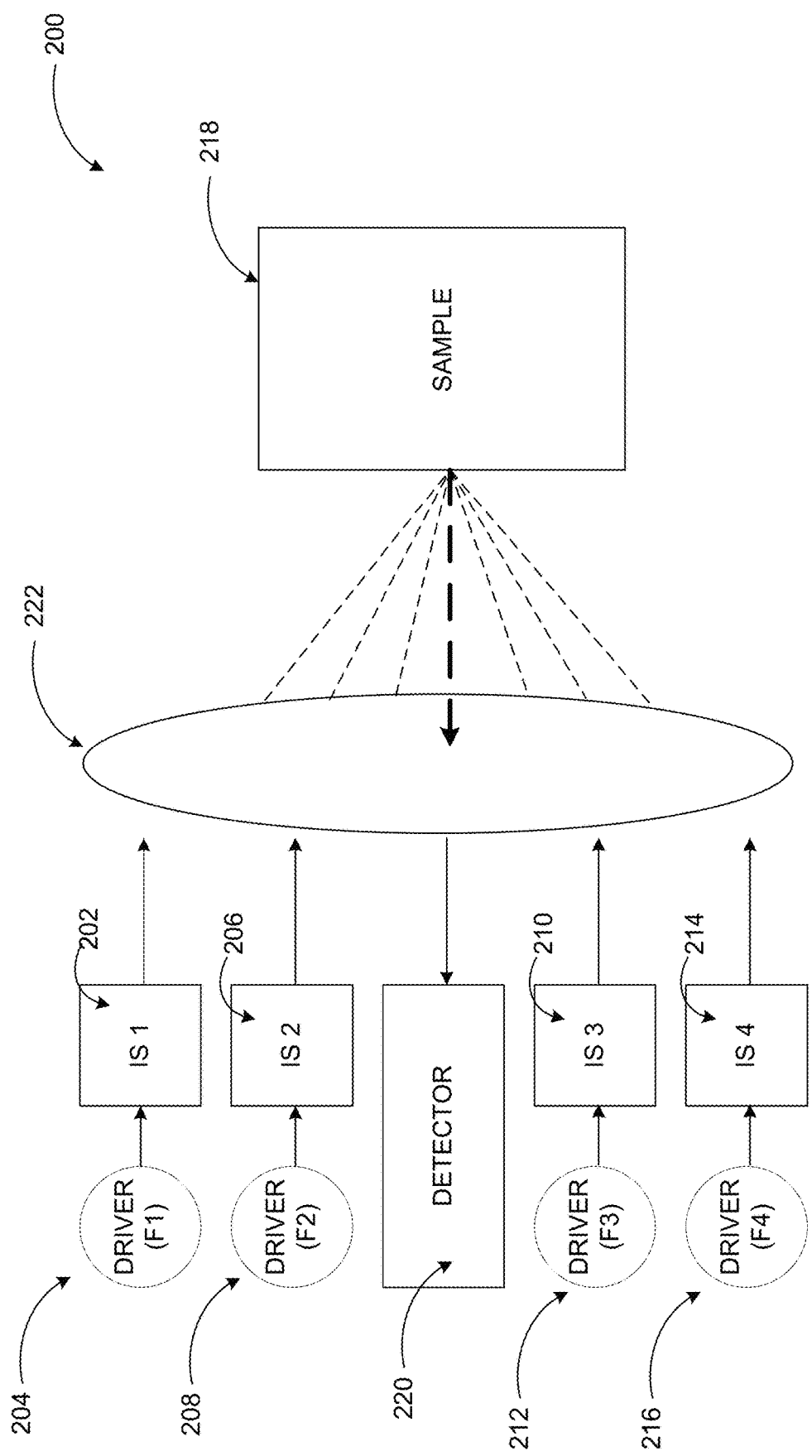
FIG. 2 illustrates an example configuration of an apparatus integrated with multiple illumination sources.

FIG. 2 illustrates an example configuration of an apparatus integrated with multiple illumination sources, arranged in accordance with at least some embodiments described herein.

As shown in a diagram 200, an example apparatus may include multiple illumination sources 202, 206, 210, and 214, one or more detectors 220, and an optical element 222. A controller configured to activate the illumination sources 202, 206, 210, and 214 may include a plurality of circuit drivers 204, 208, 212, and 216, each configured to control a current and/or a voltage for a corresponding one of illumination sources 202, 206, 210, and 214. For example, circuit driver 204 may be configured to control the current and/or the voltage for illumination source 202. Furthermore, each of the circuit drivers 204, 208, 212, and 216 may be configured to modulate the current and/or the voltage at a particular frequency for the corresponding one of illumination sources 202, 206, 210, and 214, such that each of the illumination sources 202, 206, 210, and 214 may be activated at a different modulation frequency.

For example, and as illustrated in FIG. 2, the circuit driver 204 may be configured to modulate the current or voltage for illumination source 202 at a first modulation frequency, F1, and the circuit driver 208 may be configured to modulate the current or voltage for illumination source 206 at a second modulation frequency, F2. Similarly, the circuit driver 212 may be configured to modulate the current or the voltage for illumination source 210 at a third modulation frequency, F3, and the circuit driver 216 may be configured to modulate the current or the voltage for illumination source 214 at a fourth modulation frequency, F4. Accordingly, each of the illumination sources 202, 206, 210, and 214 may be activated substantially simultaneously at a different modulation frequency, F1, F2, F3, and F4, respectively.

In some examples, the respective modulation frequency, F1, F2, F3, or F4, at which each of the illumination sources 202, 206, 210, and 214 are activated may be selected based on a determined background illumination frequency. The background illumination frequency may be determined by detecting a background illumination signal at the detectors 220 prior to the illumination of the sample 218, and determining a frequency of the background illumination signal. The respective modulation frequency at which each of the illumination sources 202, 206, 210, and 214 are activated may then be selected such that activation at the background illumination frequency is avoided when illuminating the sample 218 in order for noise from the background illumination to be minimized and/or eliminated.

In one embodiment, the selected modulation frequencies may be positive integer multiples of the background illumination frequency to enable this avoidance. For example, F1 may be computed by multiplying a positive integer and the determined background illumination frequency, and F2, F3, and F4 may be based on F1, computed by formula, (F1+ n*background illumination frequency), where n is a positive integer that is different for each modulation frequency. In an example selection scenario, a background illumination frequency of 60 Hz may be determined based on a background illumination signal detected by the detectors 220. F1 may be selected to be 100 times the 60 Hz background interference or 6 kHz, F2 may be selected to be (6 kHz+1*60 Hz) or 6.060 kHz, F3 may be selected to be (6 kHz+2*60 Hz) or 6.120 kHz, and F4 may be selected to be (6 kHz+3*60 Hz) or 6.180 kHz.

Upon activation, the illumination sources 202, 206, 210, and 214 may be configured to illuminate at least a portion of the sample 218 with light, where each of the illumination sources 202, 206, 210, and 214 have a different emission wavelength. The illumination sources 202, 206, 210, and 214 may include light emitting diodes (LEDs), lasers, gas-based illumination sources, organic light-emitting diodes (OLEDs), Terahertz radiation sources, and/or microwave radiation sources, for example. The illumination sources 202, 206, 210, and 214 may also include white light sources, ultraviolet (UV) light sources, infrared light sources, red light sources, orange light sources, yellow light sources, green light sources, blue light sources, and/or violet light sources. In some embodiments, the optical element 222 may be configured to converge incident light from the illumination sources 202, 206, 210, and 214 on to the sample 218. The optical element 222 may be a lens, for example.

The detectors 220 may be configured to detect a composite signal from the sample 218 in response to the illumination. The detectors 220 may include photodiodes, photomultiplier tubes, complementary metal oxide semiconductor (CMOS) image sensors, charged coupled devices (CCDs), and micro-channel plates, for example. The composite signal may include a plurality of returned signals. The returned signals may include reflected light, scattered light, and/or fluorescent light, for example, and each of the returned signals may correspond to light emitted from one of the illumination sources 202, 206, 210, and 214 at a respective emission wavelength. In some embodiments, the optical element 222 may be configured to collect the returned signals from the sample in response to the illumination to facilitate detection of the composite signal by the detectors 220. Due to the activation of the illumination sources 202, 206, 210, and 214 at the different modulation frequencies, F1, F2, F3, and F4, the composite signal detected by the detector 220 from the sample 218 in response to the illumination may be a linear combination of the returned signals.

Figure 3:
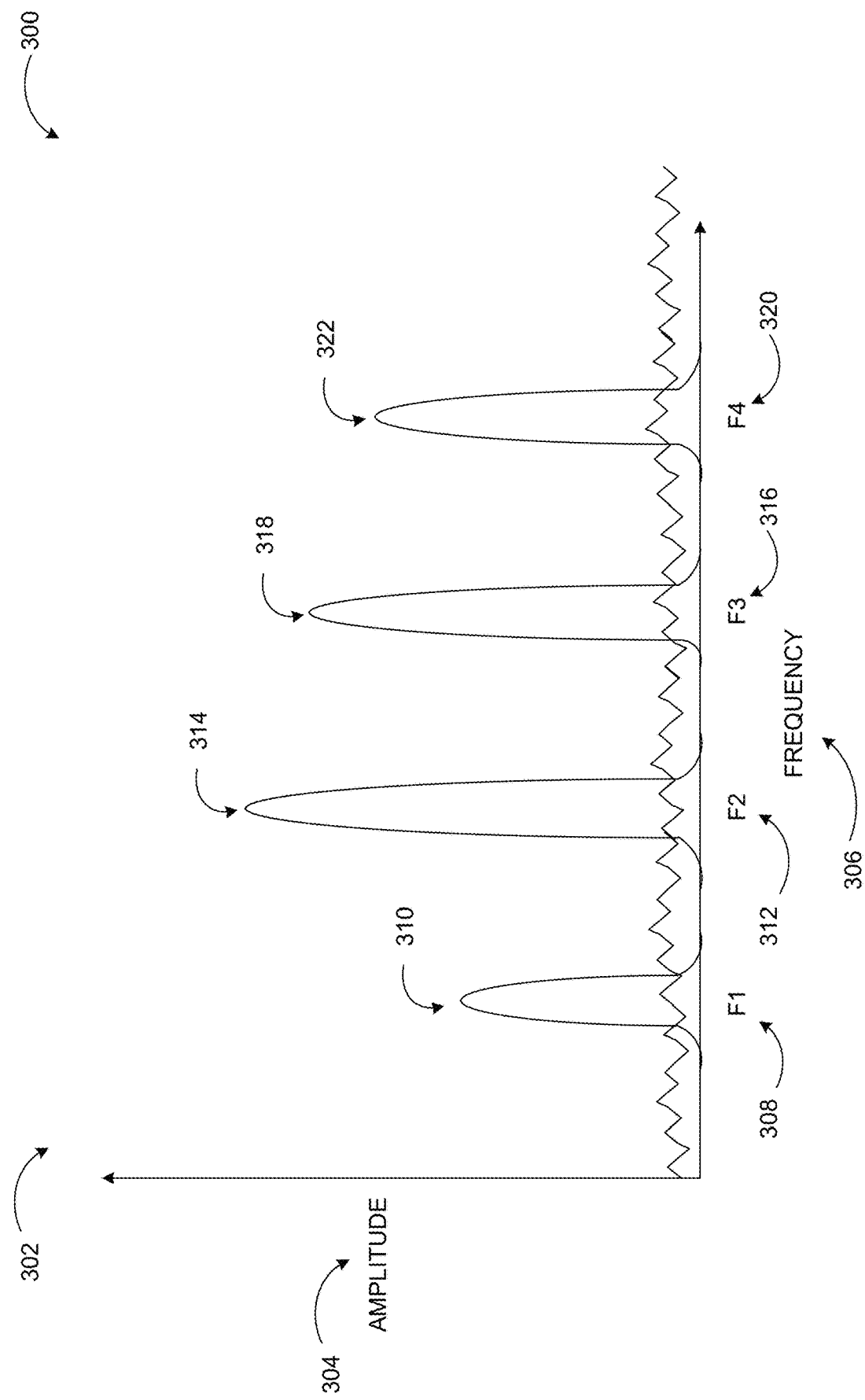
FIG. 3 illustrates an example frequency spectrum of a composite signal as detected by a detector.

FIG. 3 illustrates an example frequency spectrum of a composite signal as detected by a detector, arranged in accordance with at least some embodiments described herein.

As shown in a diagram 300, a composite signal may comprise a plurality of returned signals 310, 314, 318, and 322 from a sample. The composite signal may be detected by one or more detectors in response to an illumination of the sample by a plurality of concurrently activated illumination sources, where each illumination source may be activated at a different modulation frequency and have a different emission wavelength. The returned signals 310, 314, 318, and 322 may include reflected light, scattered light and/or fluorescent light from the sample, for example, and each of the returned signals 310, 314, 318, and 322 may correspond to light emitted from one of the illumination sources at a respective emission wavelength.

As illustrated, the frequency spectrum of the composite signal may be analyzed based on an amplitude 304 and a frequency 306. Each of the returned signals 310, 314, 318, and 322 may correspond to a particular frequency 308, 312, 316, 320, and may have an associated amplitude at that particular frequency 308, 312, 316, 320. The particular frequency 308, 312, 316, 320 may be the modulation frequency at which each illumination source was activated. For example, the returned signal 310 from the sample may be in response to light emitted from a first illumination source at a respective emission wavelength of the first illumination source. The returned signal 310 may correspond to a first modulation frequency, F1 308 associated with an amplitude, as illustrated, where F1 308 may be the frequency at which the first illumination source was activated.

Figure 4:
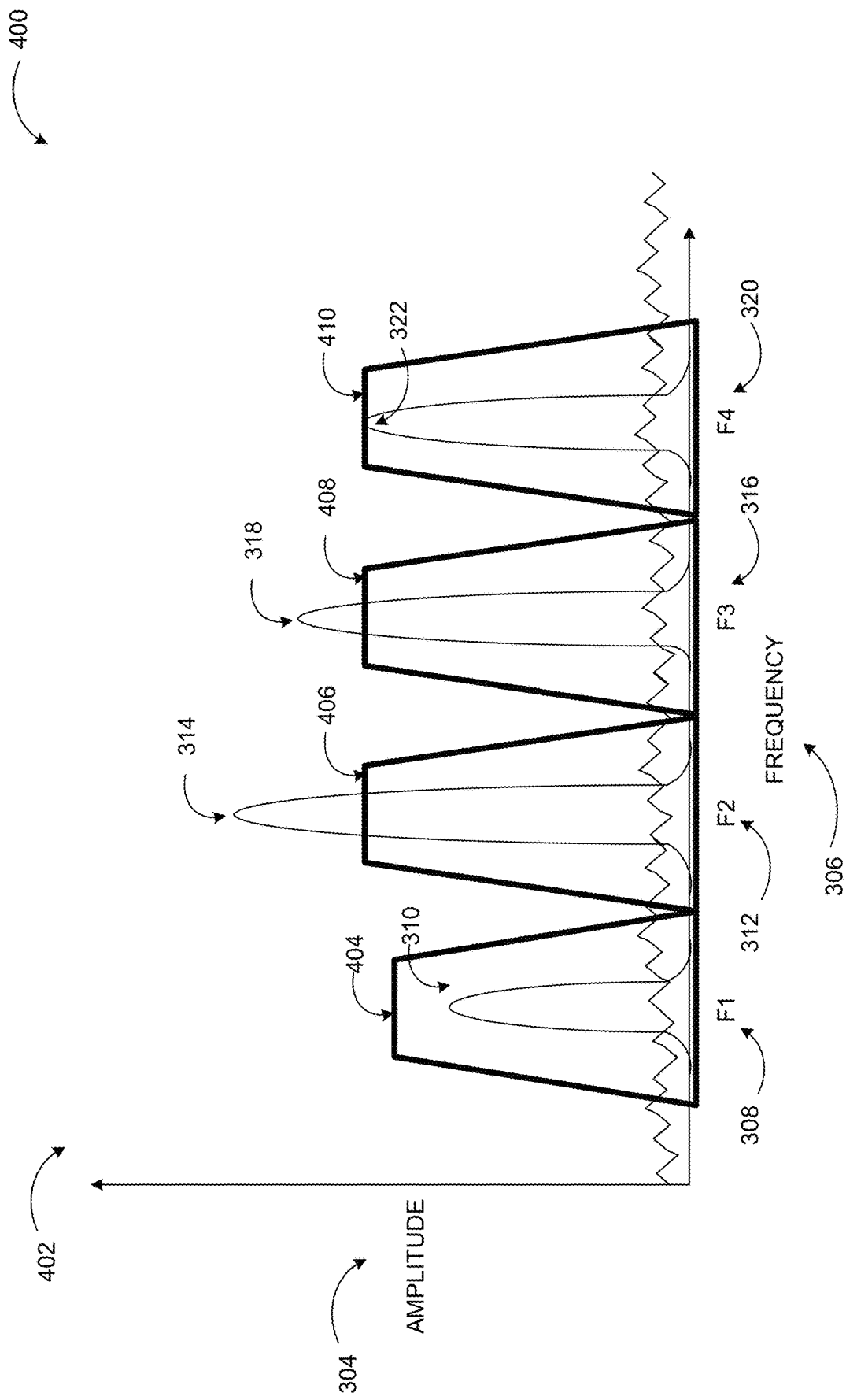
FIG. 4 illustrates an example frequency spectrum of a composite signal filtered to extract a plurality of returned signals from the composite signal.

FIG. 4 illustrates an example frequency spectrum of a composite signal filtered to extract a plurality of returned signals, arranged in accordance with at least some embodiments described herein.

As previously discussed in FIG. 3, a composite signal may comprise a plurality of returned signals 310, 314, 318, and 322 from a sample, which may be analyzed based on an amplitude 304 and a frequency 306. The composite signal may be detected by one or more detectors in response to an illumination of the sample by a plurality of concurrently activated illumination sources. In some embodiments, each of the illumination sources may have a different emission wavelength and each of the illumination sources may be activated at a different illumination frequency. Each of the returned signals 310, 314, 318, and 322 from the sample may be a response to light emitted from one of the illumination sources at a respective emission wavelength.

As shown in a diagram 400, one or more filters 404, 406, 408, and 410 may be configured to extract the returned signals 310, 314, 318, and 322 from the composite signal. Each of the filters 404, 406, 408, and 410 may be associated with a respective modulation frequency at which one of the illuminations sources are activated such that each filter may be configured to extract one of the returned signals 310, 314, 318, and 322 from the composite signal at the respective emission wavelength of the corresponding one of the illumination sources. In some embodiments, the filters may be dynamic filters, where a pass band of each of the dynamic filters is adjusted according to the respective modulation frequencies at which each of the illumination sources are activated.

In some examples, the respective modulation frequency at which each of the illumination sources are activated may be based on a background illumination frequency, which may be continuously determined prior to sampling, through-out sampling and post-sampling. In response to a determination that the background illumination frequency has been modified, another respective modulation frequency at which each of the illumination sources are activated may be selected based on the modified frequency for a next illumination of the sample. Accordingly, the dynamic filters may be adjusted based on the other respective modulation frequency at which each of the illumination sources are activated in the next illumination of the sample.

Figure 5:
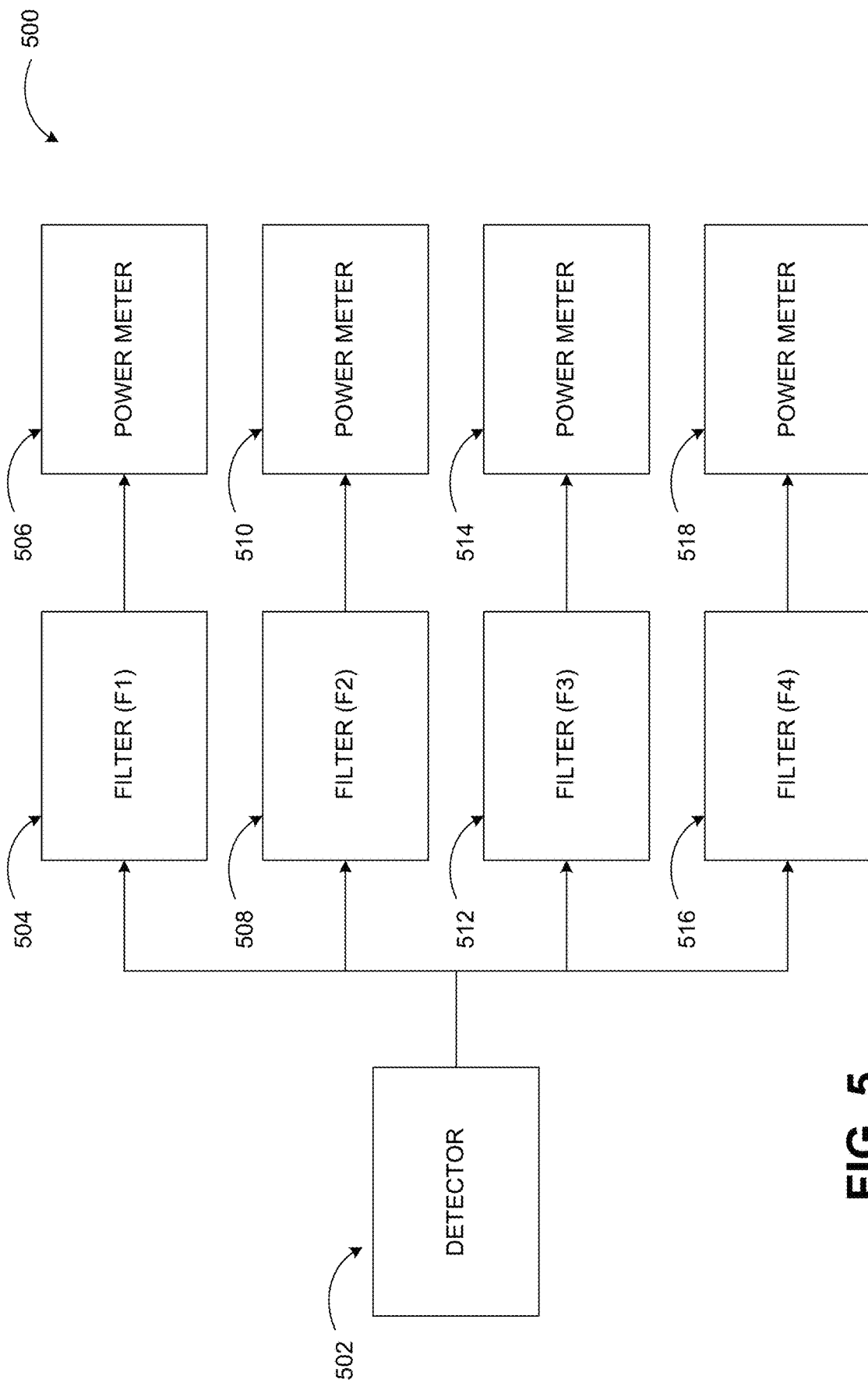
FIG. 5 illustrates a conceptual diagram illustrating one or more components of an imaging sub-system.

FIG. 5 illustrates a conceptual diagram illustrating one or more components of an imaging sub-system, arranged in accordance with at least some embodiments described herein.

As shown in a diagram 500, each of one or more detectors 502 may be coupled to one or more filters 504, 508, 512, and 516. Each of the filters 504, 508, 512, and 516 may be further coupled to a respective power meter 506, 510, 514, and 518. A composite signal comprising a plurality of returned signals may be detected by the detectors 502 in response to an illumination of the sample with light from a plurality of concurrently activated illumination sources, where each of the illumination sources have been activated at a different modulation frequency and have a different emission wavelength. The returned signals may include reflected light, scattered light, and/or fluorescent light, for example, and each of the returned signals may correspond to light emitted from one of the illumination sources at a respective emission wavelength. Each of the filters 504, 508, 512, and 516 may be associated with a respective modulation frequency at which one of the illuminations sources are activated such that each filter may be configured to extract a returned signal from the composite signal at the respective emission wavelength of the corresponding one of the illumination sources. For example, filter 504 may be associated with a modulation frequency, F1, at which a first illumination source is activated, and accordingly, the filter 504 may be configured to extract the returned signal from the composite signal that corresponds to the light emitted from the first illumination source at the respective emission wavelength. In some embodiments, the filters 504, 508, 512, and 516 may be dynamic filters, where a pass band of each of the dynamic filters is adjusted according to the respective modulation frequency at which each of the illumination sources are activated. In other embodiments, one or more demodulators or analog-to-digital conversion (ADC) and digital signal processing (DSP) may be employed to extract each of the returned signals from the composite signal at respective emission wavelengths of the illumination sources.

The power meters 506, 510, 514, and 518 may be configured to determine a peak amplitude for each of the returned signals extracted by corresponding filters 504, 508, 512, and 516, respectively. For example, power meter 506 may determine an amplitude of a spectral peak of the extracted, reflected signal corresponding to the light emitted from the first illumination source at the respective emission wavelength. In some examples, the amplitude of the spectral peak of each extracted, reflected signal determined over an illumination time period may be individually averaged to decrease a background light interference. The spectral peak amplitudes may be analyzed for each reflected signal to determine a spectral profile of the sample. Based on the determined spectral profile, one or more characteristics of the sample may be evaluated. For example, the determined spectral profile of the sample may be compared to a spectral profile of a reference sample to evaluate the characteristics.

Figure 6:
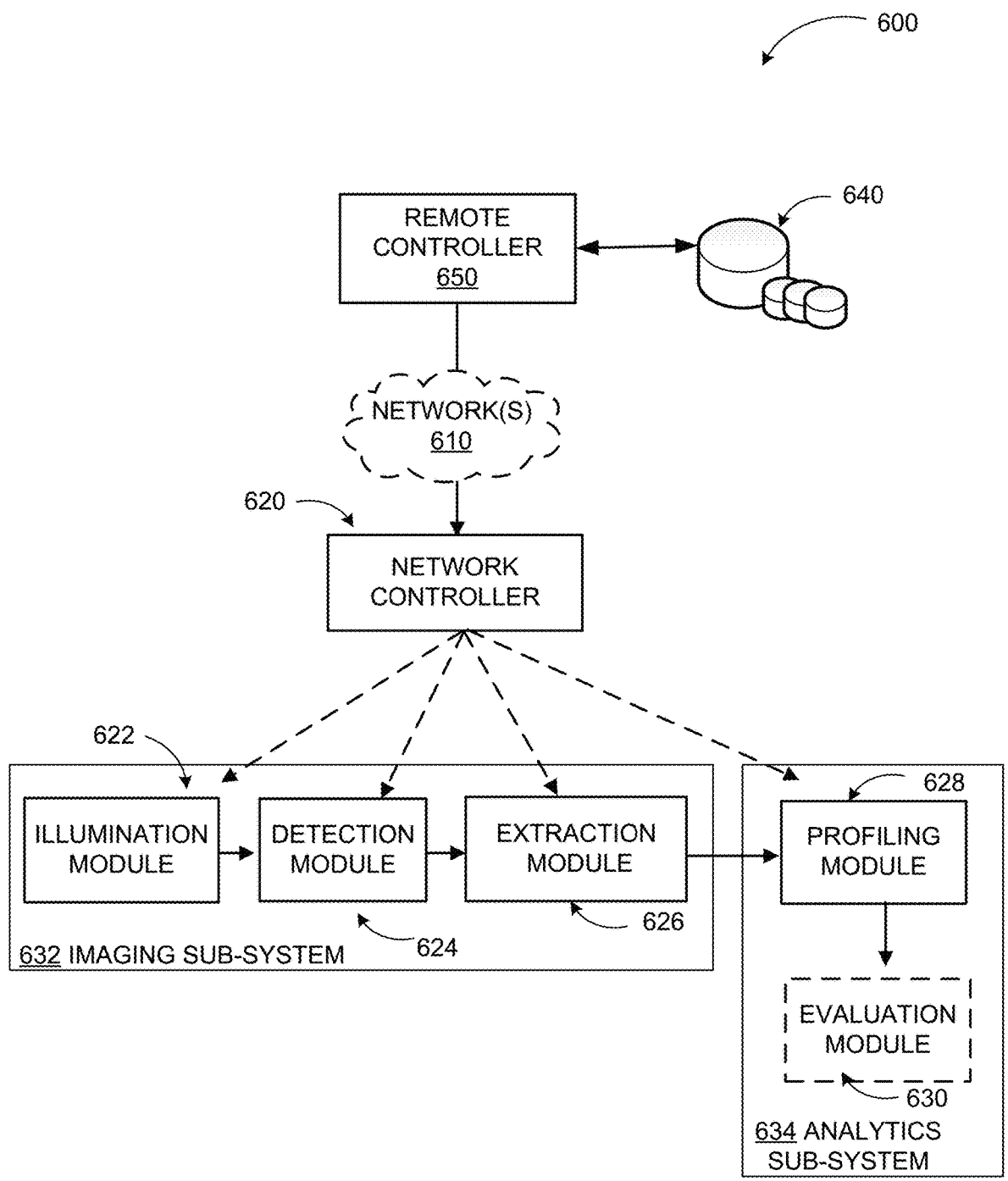
FIG. 6 illustrates an example system configured to concurrently activate multiple illumination sources to analyze a sample.

FIG. 6 illustrates an example system configured to concurrently activate multiple illumination sources to analyze a sample, arranged in accordance with at least some embodiments described herein.

System 600 may include at least one controller 620, at least one illumination module 622, at least one detection module 624, and at least one extraction module 626 of an imaging sub-system 632, and at least one profiling module 628 and at least one evaluation module 630 of an analytics sub-system 634. The controller 620 may be operated by human control or may be configured for automatic operation, or may be directed by a remote controller 650 through at least one network (for example, via network 610). Data associated with controlling the different processes of production may be stored at or received from data stores 640.

The illumination module 622 of the imaging sub-system 632 may include a plurality of illumination sources configured to illuminate one or more portions of a sample, where each illumination source has a different emission wavelength. The illumination sources may include light emitting diodes (LEDs), lasers, gas-based illumination sources, organic light-emitting diodes (OLEDs), Terahertz radiation sources, and/or microwave radiation sources, for example. The illumination sources may also include white light sources, ultraviolet (UV) light sources, infrared light sources, red light sources, orange light sources, yellow light sources, green light sources, blue light sources, and/or violet light sources. A controller associated with the imaging sub-system 632 may be configured to activate the illumination sources substantially simultaneously such that at least one of the illumination sources may illuminate a sample with light during a portion or an entirety of a same time period that another illumination source is illuminating the sample with light. Furthermore, the controller may include a plurality of driver circuits, each corresponding to one of the illumination sources, where the driver circuits are configured to control and/or modulate a current or a voltage at a particular frequency for the corresponding illumination source, such that each of the illumination sources are activated at a different modulation frequency.

The detection module 624 of the imaging sub-system 632 may include one or more detectors configured to detect a composite signal from the sample in response to the illumination. The detectors may include photodiodes, photomultiplier tubes, complementary metal oxide semiconductor (CMOS) image sensors, charged coupled devices (CCDs), and micro-channel plates, for example. The composite signal may include a plurality of returned signals, where each of the returned signals correspond to light emitted from one of the illumination sources at respective emission wavelengths. The returned signals may include reflected light, scattered light, and/or fluorescent light, among other examples. In some embodiments, the composite signal may be a linear combination of returned signals. In other embodiments, the composite signal may be a sum and/or difference of the returned signals if the two or more of the illumination sources are participating in a non-linear interaction.

The extraction module 626 of the imaging sub-system 632 may include one or more filters. Each of the filters may be associated with a respective modulation frequency at which one of the illumination sources is activated, such that each filter may be configured to extract a returned signal from the composite signal at the respective emission wavelength of the corresponding one of the illumination sources. In some embodiments, a power meter may be coupled to each of the filters to determine an amplitude of the spectral peak for each extracted, returned signal. In other embodiments, demodulators or analog-to-digital conversion (ADC) and digital signal processing (DSP) may be employed to extract each of the returned signals from the composite signal at respective emission wavelengths of the illumination sources.

The profiling module 628 of the analytics sub-system 634 may include one or more processors configured to determine a spectral profile of the sample based on an analysis of the extracted returned signals. The analysis may be based on the determined amplitudes of the spectral peaks for each respective signal.

The evaluation module 630 of the analytics sub-system 634 may include one or more processors configured to evaluate the sample based on the determined spectral profile. For example, the determined spectral profile of the sample may be compared to a spectral profile of a reference sample to evaluate the characteristics.

The examples in FIGS. 1 through 6 have been described using specific apparatuses, configurations, and systems for concurrent activation of multiple illumination sources to analyze a sample. Embodiments for concurrent activation of multiple illumination sources to analyze a sample are not limited to the specific apparatuses, configurations, and systems according to these examples.

Figure 7:
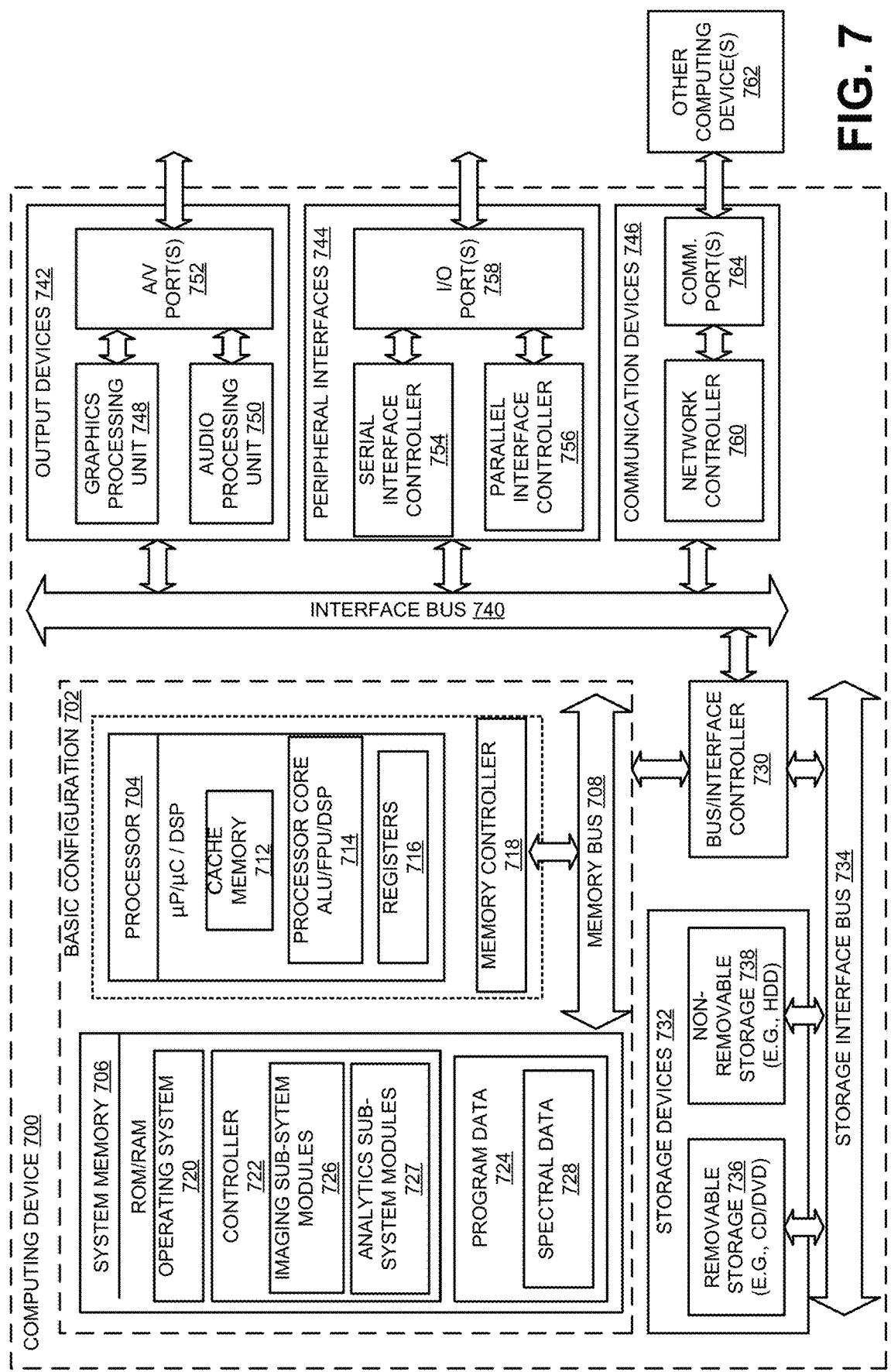
FIG. 7 illustrates a general purpose computing device, which may be used to concurrently activate multiple illumination sources to analyze a sample.

FIG. 7 illustrates a general purpose computing device, which may be used to concurrently activate multiple illumination sources to analyze a sample, arranged in accordance with at least some embodiments described herein.

For example, the computing device 700 may be used as a server, desktop computer, portable computer, smart phone, special purpose computer, or similar device such as a controller, a new component, a cluster of existing components in an operational system including a vehicle and a smart dwelling. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a controller application 722, and program data 724. The controller application 722 may include one or more imaging sub-system modules 726 and analytics sub-system modules 727, which may be an integral part of the application or a separate application on its own. The imaging sub-system modules 726 may include an illumination module, a detection module, and an extraction module. The illumination module may be configured to illuminate a sample with light from a plurality of illumination sources activated substantially simultaneously, where each of the illumination sources are activated at a different modulation frequency and have a different emission wavelength. In some examples, the respective modulation frequencies may be selected based on a background illumination frequency determined from a background illumination signal detected at one or more detectors of the detection module. The detection module may be configured to detect a composite signal from the sample in response to the illumination at the detectors, where the composite signal includes a plurality of returned signals, and each of the returned signals corresponds to light emitted from one of the illumination sources at a respective emission wavelength. The extraction module may be configured to extract the returned signals from the composite signal at one or more filters, where each filter is associated with a respective modulation frequency at which one of the illuminations sources are activated such that each filter may be configured to extract a returned signal from the composite signal at the respective emission wavelength of the corresponding one of the illumination sources. The analytics sub-system modules 727 may include a profiling module and an evaluation module. The profiling module may be configured to determine a spectral profile of the sample based on an analysis of each of the extracted signals. The evaluation module may be configured to evaluate one or more characteristics of the sample based on the determined spectral profile. The program data 724 may include, among other data, spectral data 728 related to the extracted signal analysis for determination of the spectral profile, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to concurrently activate multiple illumination sources to analyze a sample. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
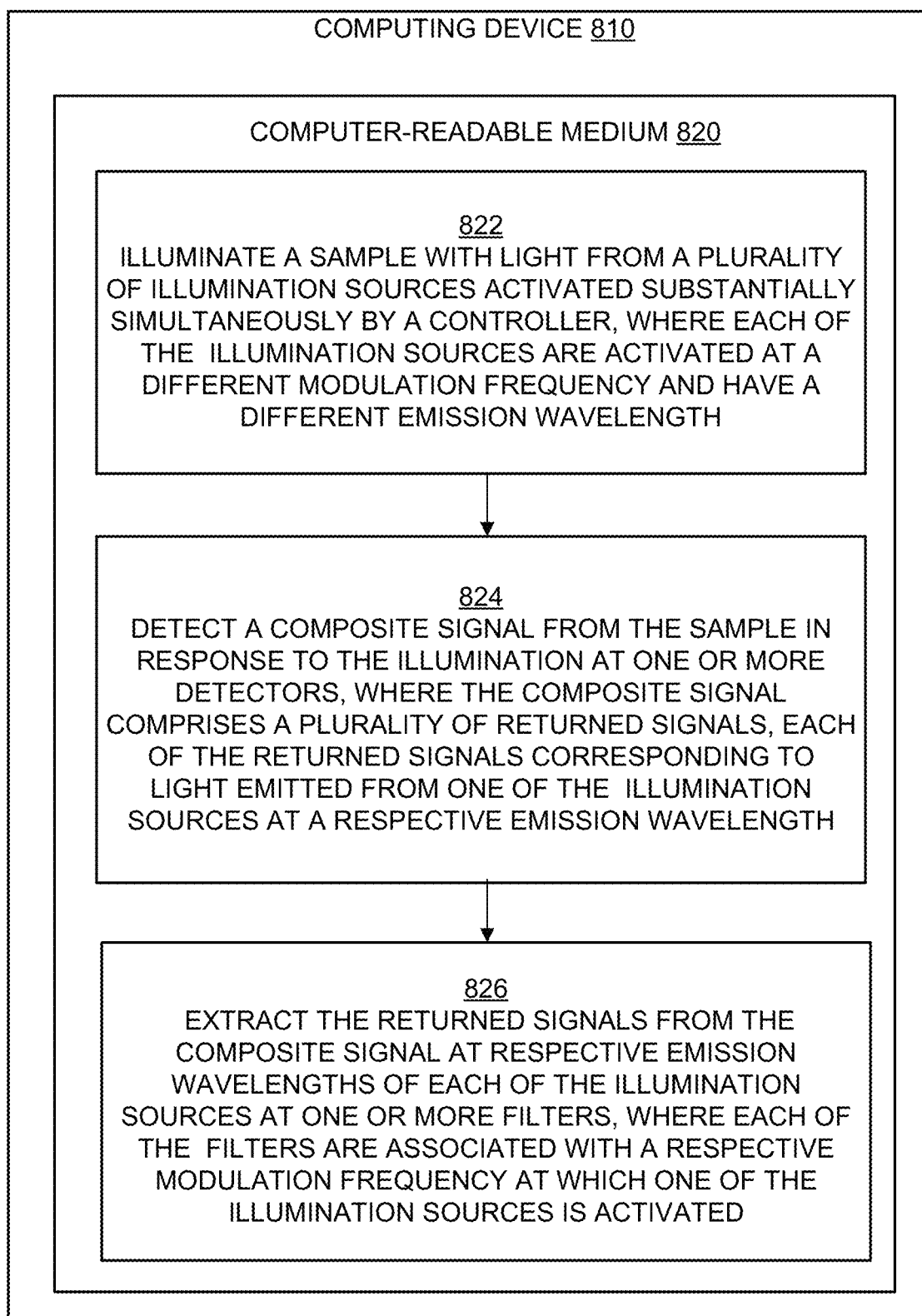
FIG. 8 is a flow diagram illustrating an example process to concurrently activate multiple illumination sources to analyze a sample that may be performed by a computing device such as the computing device in FIG. 7.

FIG. 8 is a flow diagram illustrating an example process to concurrently activate multiple illumination sources to analyze a sample that may be performed by a computing device such as the computing device in FIG. 7, arranged in accordance with at least some embodiments described herein.

Example methods may include one or more operations, functions or actions as illustrated by one or more of blocks 822, 824, and/or 826. The operations described in the blocks 822 through 826 may also be stored as computer-executable instructions in a computer-readable medium such as a computer-readable medium 820 of a computing device 810.

An example process to concurrently activate multiple illumination sources to analyze a sample may begin with block 822, "ILLUMINATE A SAMPLE WITH LIGHT FROM A PLURALITY OF ILLUMINATION SOURCES ACTIVATED SUBSTANTIALLY SIMULTANEOUSLY BY A CONTROLLER, WHERE EACH OF THE ILLUMINATION SOURCES ARE ACTIVATED AT A DIFFERENT MODULATION FREQUENCY AND HAVE A DIFFERENT EMISSION WAVELENGTH," where a plurality of illumination sources may be configured to illuminate one or more portions of a sample, and each illumination source may have a different emission wavelength. A controller may be configured to activate the illumination sources substantially simultaneously such that at least one of the illumination sources may illuminate a sample with light during a portion or an entirety of a same time period that at least one other illumination source is illuminating the sample with light. The controller may include a plurality of driver circuits, each corresponding to one of the illumination sources, where each driver circuit may be configured to control and/or modulate a current or a voltage at a particular frequency for the corresponding illumination source, such that each of the illumination sources are activated at a different modulation frequency.

Block 822 may be followed by block 824, "DETECT A COMPOSITE SIGNAL FROM THE SAMPLE IN RESPONSE TO THE ILLUMINATION AT ONE OR MORE DETECTORS, WHERE THE COMPOSITE SIGNAL COMPRISES A PLURALITY OF RETURNED SIGNALS, EACH OF THE RETURNED SIGNALS CORRESPONDING TO LIGHT EMITTED FROM ONE OF THE PLURALITY OF ILLUMINATION SOURCES AT A RESPECTIVE EMISSION WAVELENGTH," where one or more detectors may be configured to detect a composite signal from the sample in response to the illumination. The composite signal may include a plurality of returned signals, where each of the returned signals corresponds to light emitted from one of the illumination sources at a respective emission wavelength. The returned signals may include reflected light, scattered light, and/or fluorescent light, for example.

Block 824 may be followed by block 826, "EXTRACT THE RETURNED SIGNALS FROM THE COMPOSITE SIGNAL AT RESPECTIVE WAVELENGTHS OF EACH OF THE ILLUMINATION SOURCES AT ONE OR MORE FILTERS, WHERE EACH OF THE FILTERS ARE ASSOCIATED WITH A RESPECTIVE MODULATION FREQUENCY AT WHICH ONE OF THE ILLUMINATION SOURCES IS ACTIVATED," where each of one or more filters may be associated with a respective modulation frequency at which one of the illumination sources is activated, such that the filters may be configured to extract each of the returned signals from the composite signal at respective emission wavelengths of the illumination sources. In some embodiments, at least one power meter may be coupled to each of the filters, where the power meters may be configured to determine an amplitude of a spectral peak of each reflected signal extracted. In some examples, the amplitude of the spectral peak of each extracted reflected signal determined over an illumination time period may be individually averaged to decrease a background light interference.

The blocks included in the above described process are for illustration purposes. Concurrent activation of multiple illumination sources to analyze a sample may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 9 illustrates a block diagram of an example computer program product, arranged in accordance with at least some embodiments described herein.

In some embodiments, as shown in FIG. 9, the computer program product 900 may include a signal bearing medium 902 that may also include one or more machine readable instructions 904 that, when executed by, for example, a processor, may provide the functionality described herein. Thus, for example, referring to the processor 704 in FIG. 7, imaging sub-system modules 726 and analytics sub-system modules 727 executed on the processor 704 may undertake one or more of the tasks shown in FIG. 9 in response to the instructions 904 conveyed to the processor 704 by the medium 902 to perform actions associated with determination of a spectral profile of a sample as described herein. Some of those instructions may include, for example, one or more instructions to illuminate a sample with light from a plurality of illumination sources activated substantially simultaneously by a controller, where each of the plurality of illumination sources are activated at a different modulation frequency and have a different emission wavelength, detect a composite signal from the sample in response to the illumination, where the composite signal comprises a plurality of returned signals, each of the returned signals corresponding to light emitted from one of the illumination sources at a respective emission wavelength, and extract the returned signals from the composite signal at respective emission wavelengths of each of the illumination sources at one or more filters, where each of the filters are associated with a respective modulation frequency at which one of the illumination sources is activated.

In some implementations, the signal bearing medium 902 depicted in FIG. 9 may encompass a computer-readable medium 906, such as, but not limited to, a hard disk drive, a solid state drive, a Compact Disc (CD), a Digital Versatile Disk (DVD), a digital tape, memory, etc. In some implementations, the signal bearing medium 902 may encompass a recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (for example, a fiber optic cable, a waveguide, a wired communications link, a wireless communication link, etc.). Thus, for example, the program product 900 may be conveyed to one or more modules of the processor 704 of FIG. 7 by an RF signal bearing medium, where the signal bearing medium 902 is conveyed by the wireless communications medium 910 (for example, a wireless communications medium conforming with the IEEE 802.11 standard).

Figure 10:
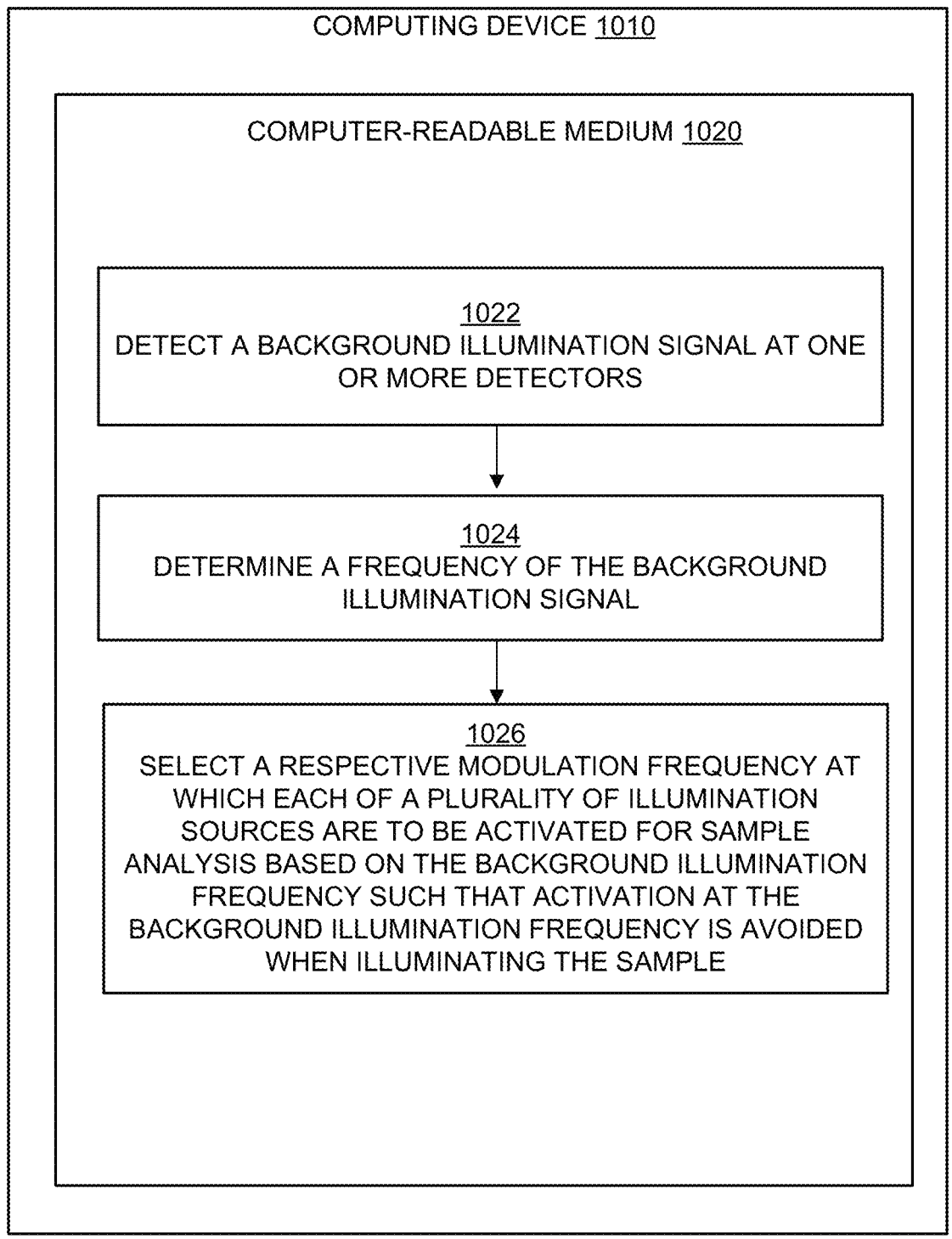
FIG. 10 is a flow diagram illustrating an example process to select modulation frequencies at which multiple illumination sources are concurrently activated for sample analysis that may be performed by a computing device such as the computing device in FIG. 7.

FIG. 10 is a flow diagram illustrating an example process to select modulation frequencies at which to concurrently activate multiple illumination sources for sample analysis that may be performed by a computing device such as the computing device in FIG. 7, arranged in accordance with at least some embodiments described herein.

Example methods may include one or more operations, functions or actions as illustrated by one or more of blocks 1022, 1024, and/or 1026. The operations described in the blocks 1022 through 1026 may also be stored as computer-executable instructions in a computer-readable medium such as a computer-readable medium 1020 of a computing device 1010.

An example process to select modulation frequencies at which to concurrently activate multiple illumination sources for sample analysis may begin with block 1022, "DETECT A BACKGROUND ILLUMINATION SIGNAL AT ONE OR MORE DETECTORS," where one or more detectors may be configured to detect a background illumination signal prior to the illumination of the sample. The detectors may include photodiodes, photomultiplier tubes, complementary metal oxide semiconductor (CMOS) image sensors, charged coupled devices (CCDs), and micro-channel plates, for example.

Block 1022 may be followed by block 1024, "DETERMINE A FREQUENCY OF THE BACKGROUND ILLUMINATION SIGNAL," where a frequency of the background illumination signal may be determined. In some examples, the frequency of the background illumination signal may be continuously determined from detected background illumination signals at the detectors.

Block 1024 may be followed by block 1026, "SELECT A RESPECTIVE MODULATION FREQUENCY AT WHICH EACH OF A PLURALITY OF ILLUMINATION SOURCES ARE TO BE ACTIVATED FOR SAMPLE ANALYSIS BASED ON THE BACKGROUND ILLUMINATION FREQUENCY SUCH THAT ACTIVATION AT THE BACKGROUND ILLUMINATION FREQUENCY IS AVOIDED WHEN ILLUMINATING THE SAMPLE," where a respective modulation frequency at which each of the illumination sources are activated may be selected such that activation at the background illumination frequency is avoided when illuminating the sample in order for noise from the background illumination to be minimized and/or eliminated. In some examples, the selected modulation frequencies may be positive integer multiples of the background illumination frequency. A start modulation frequency may be computed by multiplying a positive integer and the determined background illumination frequency, and subsequent modulation frequencies may be based on the start modulation frequency, computed by formula, (start modulation frequency+n*background illumination frequency), where n is a positive integer that is different for each modulated frequency. In other examples, a time period for illuminating the sample may also be selected based on a background illumination frequency such that background interference is minimized, where the sample illumination time is equal to a positive integer multiple of an inverse of the background illumination frequency.

In some embodiments, if the frequency of the background illumination signal is being continuously determined, and a modification to the background illumination frequency is determined, another respective modulation frequency at which each of the illumination sources are to be activated may be selected based on the modified frequency.

The blocks included in the above described process are for illustration purposes. Selection of modulation frequencies at which to concurrently activate of multiple illumination sources for sample analysis may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 11 illustrates a block diagram of an example computer program product, arranged in accordance with at least some embodiments described herein.

In some embodiments, as shown in FIG. 11, the computer program product 1100 may include a signal bearing medium 1102 that may also include one or more machine readable instructions 1104 that, when executed by, for example, a processor, may provide the functionality described herein. Thus, for example, referring to the processor 704 in FIG. 7, imaging sub-system modules 726 and analytics sub-system modules 727 executed on the processor 704 may undertake one or more of the tasks shown in FIG. 11 in response to the instructions 1104 conveyed to the processor 704 by the medium 1102 to perform actions associated with determination of a spectral profile of a sample as described herein. Some of those instructions may include, for example, one or more instructions to detect a background illumination signal at one or more detectors, determine a frequency of the background illumination signal, and select a representative modulation frequency at which each of a plurality of illumination sources is to be activated for sample analysis based on the background illumination frequency such that activation at the background illumination frequency is avoided when illuminating the sample.

In some implementations, the signal bearing medium 1102 depicted in FIG. 11 may encompass a computer-readable medium 1106, such as, but not limited to, a hard disk drive, a solid state drive, a Compact Disc (CD), a Digital Versatile Disk (DVD), a digital tape, memory, etc. In some implementations, the signal bearing medium 1102 may encompass a recordable medium 1108, such as, but not limited to, memory, read/write (R/W) CDs, R/W DVDs, etc. In some implementations, the signal bearing medium 1102 may encompass a communications medium 1110, such as, but not limited to, a digital and/or an analog communication medium (for example, a fiber optic cable, a waveguide, a wired communications link, a wireless communication link, etc.). Thus, for example, the program product 1100 may be conveyed to one or more modules of the processor 704 of FIG. 7 by an RF signal bearing medium, where the signal bearing medium 1102 is conveyed by the wireless communications medium 1110 (for example, a wireless communications medium conforming with the IEEE 802.11 standard).

According to some examples, an apparatus may be described herein. An example apparatus may include a plurality of illumination sources configured to illuminate a sample with light, where each of the illumination sources may have a different emission wavelength. The example apparatus may also include controller configured to activate the illumination sources substantially simultaneously, where each of the illumination sources may be configured to be activated at a different modulation frequency. The example apparatus may further include one or more detectors positioned adjacent to the plurality of illumination sources, the detectors configured to detect a composite signal from the sample in response to the illumination, where the composite signal may include a plurality of returned signals, each of the returned signals corresponding to light emitted from one of the illumination sources at a respective emission wavelength.

In other examples, the controller may include a plurality of driver circuits, and each of the driver circuits may be configured to control a current and/or a voltage for a corresponding one of the illumination sources. Each of the driver circuits may be configured to modulate the current and/or the voltage at a particular frequency for the corresponding one of the illumination sources such that each of the illumination sources are activated at the different modulation frequency. A respective modulation frequency at which each of the illumination sources are activated may be selected based on a background illumination frequency such that activation at the background illumination frequency is avoided when illuminating the sample. The return signals may include reflected light, scattered light, and/or fluorescence light from the sample. Different modulation frequencies of each of the illumination sources may be selected such that the composite signal is a linear combination of the returned signals. The composite signal may be a sum or a difference of the returned signals if two or more of the illumination sources are participating in a non-linear interaction.

In further examples, the example apparatus may also include one or more demodulators configured to extract the returned signals from the composite signal at respective emission wavelengths of each of the illumination sources based on respective modulation frequencies at which each of the illumination sources are activated. Analog-to-digital conversion (ADC) and digital signal processing (DSP) may be employed to extract the returned signals from the composite signal at respective emission wavelengths of each of the illumination sources based on respective modulation frequencies at which each of the illumination sources are activated. The example apparatus may also include one or more filters, each filter associated with a respective modulation frequency at which one of the illumination sources is activated, where the filters may be configured to extract the returned signals from the composite signal at respective emission wavelengths of each of the illumination sources. The filters may include one or more dynamic filters, where a pass band of each of the dynamic filters may be adjusted according to the respective modulation frequency at which each of the illumination sources are activated. The example apparatus may further include one or more power meters configured to determine an amplitude of a spectral peak associated with each of the returned signals upon extraction from the composite signal. The example apparatus may yet further include an optical element configured to converge incident light from the illumination sources on to the sample to illuminate the sample, and collect the returned signals from the sample in response to the illumination. The optical element may include lenses, reflectors, and/or partial reflectors that are configured to reflect light, partially reflect light, or occlude light.

In yet further examples, the apparatus may be communicatively coupled to one or more processors of an analytics sub-system through wired or wireless communication media, the processors configured to analyze each of the returned signals to determine a spectral profile of the sample. The illumination sources may include light emitting diodes (LEDs), lasers, gas-based illumination sources, organic light-emitting diodes (OLEDs), Terahertz radiation sources, and/or microwave radiation sources. The illumination sources may also comprise white light sources, ultraviolet (UV) light sources, infrared light sources, red light sources, orange light sources, yellow light sources, green light sources, blue light sources, and/or violet light sources. The detectors may include photodiodes, photomultiplier tubes, complementary metal oxide semiconductor (CMOS) image sensors, charged coupled devices (CCDs), and/or microchannel plates.

According to some embodiments, systems configured to concurrently activate multiple illumination sources for sample analysis may be described. An example system may include an imaging sub-system and an analytics sub-system. The imaging sub-system may include an illumination module configured to illuminate a sample with light from a plurality of illumination sources activated substantially simultaneously by a controller, where each of the illumination sources may be activated at a different modulation frequency and have a different emission wavelength. The imaging sub-system may also include a detection module configured to detect a composite signal from the sample in response to the illumination through one or more detectors positioned adjacent to the plurality of illumination sources, where the composite signal may include a plurality of returned signals, each of the returned signals corresponding to light emitted from one of the illumination sources at a respective emission wavelength. The imaging sub-system may further include an extraction module configured to extract the returned signals from the composite signal at respective emission wavelengths of each of the illumination sources through one or more filters, where each of the filters may be associated with a respective modulation frequency at which one of the illumination sources is activated. The analytics sub-system may include one or more processors coupled to the imaging sub-system, the processors configured to analyze each of the returned signals extracted to determine a spectral profile of the sample.

In other embodiments, the imaging sub-system may further include a controller that includes a plurality of driver circuits, each of the driver circuits configured to modulate a current or a voltage at a particular frequency for a corresponding one of the illumination sources such that each of the illumination sources may be activated at the different modulation frequency. Each of the driver circuits may be configured to modulate the current or the voltage in a sinusoidal waveform or a non-sinusoidal waveform. The respective modulation frequency at which each of the driver circuits modulate the current or the voltage may be selected based on a background illumination frequency such that activation at the background illumination frequency is avoided when illuminating the sample.

In further embodiments, the processors may be further configured to analyze each of the returned signals based on an amplitude of a spectral peak associated with each of the returned signals. The amplitude of the spectral peak associated with each of the returned signals may be determined at a power meter coupled to each of the filters. The analytics sub-system may further include an evaluation module configured to evaluate one or more characteristics of the sample based on the determined spectral profile. One or more of the illumination module, detection module, extraction module, the processors, and the evaluation module may be separate, interchangeable modules of the system.

According to some examples, methods to concurrently activate multiple illumination sources for sample analysis may be provided. An example method may include illuminating a sample with light from a plurality of illumination sources activated substantially simultaneously by a controller, where each of the illumination sources may be activated at a different modulation frequency and have a different emission wavelength. The example method may also include detecting a composite signal from the sample in response to the illumination at one or more detectors positioned adjacent to the illumination sources, where the composite signal may include a plurality of returned signals, each of the returned signals corresponding to light emitted from one of the illumination sources at a respective emission wavelength. The example method may further include extracting the returned signals from the composite signal at respective emission wavelengths of each of the illumination sources at one or more filters, where each of the filters may be associated with a respective modulation frequency at which one of the illumination sources is activated, and may be coupled to each of the detectors.

In other examples, a background illumination frequency may be determined based on a background illumination signal detected by the detectors prior to the illumination of the sample. The controller may include a plurality of driver circuits, and each of the driver circuits may be configured to modulate a current and/or a voltage at a particular frequency for a corresponding one of the illumination sources based on the background illumination frequency such that activation at the background illumination frequency is avoided when illuminating the sample. An amplitude of a spectral peak associated with each of the returned signals extracted may be determined at a power meter coupled to each of the filters. The amplitude of the spectral peak associated with each of the returned signals determined over an illumination time period may be individually averaged to decrease a background light interference.

In further examples, the amplitude of the spectral peak associated with each of the returned signals extracted may be analyzed to determine a spectral profile of the sample. One or more characteristics of the sample may be evaluated based on the determined spectral profile, where evaluating the characteristics of the sample may include comparing the determined spectral profile of the sample and a spectral profile of a reference sample.

According to some embodiments, methods to select modulation frequencies at which multiple illumination sources are concurrently activated for sample analysis may be provided. An example method may include detecting a background illumination signal at one or more detectors, determining a frequency of the background illumination signal, and selecting a respective modulation frequency at which each of a plurality of illumination sources are to be activated for sample analysis based on the background illumination frequency, such that activation at the background illumination frequency may be avoided when illuminating the sample.

In other embodiments, a start modulation frequency for a first one of the illumination sources to be activated may be selected based on a multiplication of a positive integer and the background illumination frequency. Respective modulation frequencies for subsequent ones of the illumination sources to be activated substantially simultaneously may be selected based on the start modulation frequency. The respective modulation frequencies for the subsequent ones of the plurality of illumination sources may be selected based on a formula, (start modulation frequency+ n*background illumination frequency), where n is a positive integer that is different for each of the respective modulation frequencies.

In further embodiments, a time period for illuminating the sample may be selected based on the background illumination frequency such that background interference is minimized, where the sample illumination time may be equal to an inverse of the background illumination frequency. A frequency of the background illumination signal may be continuously determined, and in response to a determination that the background illumination frequency is modified, another respective modulation frequency at which each of the illumination sources are to be activated may be selected based on the modified frequency.

In some examples, an apparatus comprises a plurality of illumination sources configured to illuminate a sample with light, and a controller configured to activate the plurality of illumination sources substantially simultaneously, wherein each of the plurality of illumination sources has a different emission wavelength, and wherein each of the plurality of illumination sources are configured to be activated at a different modulation frequency. An apparatus may further include one or more detectors positioned adjacent to or otherwise proximate the plurality of illumination sources, the one or more detectors configured to detect a composite signal from the sample in response to the illumination. A composite signal may comprise a plurality of returned signals, each of the plurality of returned signals corresponding to light emitted from one of the plurality of illumination sources at a respective emission wavelength.

In some examples, activation of each of the illumination sources may include activation with a combination of a modulation signal and optionally an offset signal. The modulation signal may be a signal varying with time, for example a sinusoidal signal. An offset signal may be a signal which does not vary appreciably with time (e.g. appreciably in respect to the detected signal), and may be provided to an illumination source to prevent the light from the illumination source from falling to zero, or falling below a predetermined threshold light level. A non-zero offset signal may improve the linearity of the illumination source response, and reduce non-sinusoidal components in the modulated emitted light.

While various compositions, methods, systems, and devices are described in terms of "comprising" various components or steps (interpreted as meaning "including, but not limited to"), the compositions, methods, systems, and devices can also "consist essentially of" or "consist of" the various components and steps, and such terminology should be interpreted as defining essentially closed-member groups."

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure includes the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. An apparatus, comprising:
   a plurality of illumination sources configured to illuminate a sample with light, wherein each of the plurality of illumination sources has a different respective emission wavelength;
   a controller configured to activate the plurality of illumination sources substantially simultaneously, wherein each of the plurality of illumination sources is configured to be activated at a different respective modulation frequency;
   one or more detectors positioned adjacent to the plurality of illumination sources, wherein the one or more detectors are configured to detect a composite signal from the sample in response to the illumination of the sample, wherein the composite signal comprises a plurality of returned signals, and wherein each of the plurality of returned signals corresponds to light emitted from a respective one of the plurality of illumination sources at the respective emission wavelength; and
   one or more dynamic filters, wherein each dynamic filter is associated with the respective modulation frequency at which each of the plurality of illumination sources is activated, wherein the one or more dynamic filters are configured to extract the plurality of returned signals from the composite signal, and wherein a pass band of each of the dynamic filters is adjustable according to the respective modulation frequency at which each of the plurality of illumination sources is activated.

2. The apparatus of claim 1, wherein the controller includes a plurality of driver circuits, and wherein each of the plurality of driver circuits is configured to control at least one of a current and a voltage for a corresponding one of the plurality of illumination sources.

3. The apparatus of claim 2, wherein each of the plurality of driver circuits is configured to modulate the at least one of the current and the voltage at a particular frequency for the corresponding one of the plurality of illumination sources such that each of the plurality of illumination sources is activated at the different respective modulation frequency.

4. The apparatus of claim 1, wherein the plurality of returned signals includes one or more of reflected light, scattered light, and fluorescence light from the sample.

5. The apparatus of claim 1, wherein the different respective modulation frequency of each of the plurality of illumination sources is selected such that the composite signal is a linear combination of the plurality of returned signals.

6. The apparatus of claim 1, wherein the composite signal is one of a sum or a difference of the plurality of returned signals if two or more of the plurality of illumination sources are participating in a non-linear interaction.

7. The apparatus of claim 1, further comprising one or more power meters configured to determine an amplitude of a spectral peak associated with each of the plurality of returned signals upon extraction from the composite signal.

8. The apparatus of claim 1, further comprising an optical element configured to:
converge incident light from the plurality of illumination sources on to the sample to illuminate the sample; and
collect the plurality of returned signals from the sample in response to the illumination of the sample.

9. The apparatus of claim 8, wherein the optical element includes one or more of lenses, reflectors, and partial reflectors that are configured to one of reflect light, partially reflect light, or occlude light.

10. The apparatus of claim 1, wherein the apparatus is communicatively coupled to one or more processors of an analytics sub-system through wired or wireless communication media, and wherein the one or more processors are configured to analyze each of the plurality of returned signals to determine a spectral profile of the sample.

11. The apparatus of claim 1, wherein the plurality of illumination sources includes one or more of light emitting diodes (LEDs), lasers, gas-based illumination sources, organic light-emitting diodes (OLEDs), terahertz radiation sources, and microwave radiation sources.

12. The apparatus of claim 11, wherein the plurality of illumination sources comprises one or more of white light sources, ultraviolet (UV) light sources, infrared light sources, red light sources, orange light sources, yellow light sources, green light sources, blue light sources, and violet light sources.

13. The apparatus of claim 1, wherein the one or more detectors include one or more of photodiodes, photomultiplier tubes, complementary metal oxide semiconductor (CMOS) image sensors, charged coupled devices (CCDs), and micro-channel plates.

14. The apparatus of claim 1, wherein the respective modulation frequency at which each of the plurality of illumination sources are activated is selected based on a background illumination frequency such that activation at the background illumination frequency is avoided while the sample is illuminated.

15. A method to select modulation frequencies at which multiple illumination sources are concurrently activated for sample analysis, the method comprising:
detecting a background illumination signal at one or more detectors;
determining a background illumination frequency of the background illumination signal; and
selecting a respective modulation frequency at which each of a plurality of illumination sources is to be activated for sample analysis based on the background illumination frequency, such that activation at the background illumination frequency is avoided while illuminating the sample.

16. The method of claim 15, wherein selecting the respective modulation frequency at which each of the plurality of illumination sources is to be activated for sample analysis based on the background illumination frequency comprises:
selecting a start modulation frequency for a first one of the plurality of illumination sources to be activated based on a multiplication of a positive integer and the background illumination frequency.

17. The method of claim 16, wherein selecting the respective modulation frequency at which each of the plurality of illumination sources is to be activated for sample analysis based on the background illumination frequency further comprises:
selecting respective modulation frequencies for subsequent ones of the plurality of illumination sources to be activated substantially simultaneously based on the start modulation frequency.

18. The method of claim 17, wherein the respective modulation frequencies for the subsequent ones of the plurality of illumination sources are selected based on a formula, (start modulation frequency+n*background illumination frequency), and wherein n is a positive integer that is different for each of the respective modulation frequencies.

19. The method of claim 15, further comprising:
selecting a time period to illuminate the sample based on the background illumination frequency such that background interference is minimized, wherein the time period to illuminate the sample is equal to an inverse of the background illumination frequency.

20. The method of claim 15, further comprising:
continuously determining the background illumination frequency of the background illumination signal; and
in response to a determination that the background illumination frequency is modified, selecting another respective modulation frequency at which each of the plurality of illumination sources are to be activated based on the modified background illumination frequency.

21. An apparatus, comprising:
a plurality of illumination sources configured to be concurrently activated at different respective modulation frequencies for sample analysis, wherein each of the plurality of illumination sources has a different respective emission wavelength;
one or more detectors configured to detect a background illumination signal; and
a controller configured to:
determine a background illumination frequency of the background illumination signal; and
based on the background illumination frequency, select a respective modulation frequency at which each of a plurality of illumination sources is to be activated for the sample analysis, such that activation at the background illumination frequency is avoided while the sample is illuminated.

22. The apparatus of claim 21, wherein the one or more detectors are positioned adjacent to the plurality of illumination sources, wherein the one or more detectors are configured to detect a composite signal from the sample in response to the illumination of the sample, wherein the composite signal comprises a plurality of returned signals, and wherein each of the plurality of returned signals corresponds to light emitted from a respective one of the plurality of illumination sources at the respective emission wavelength, and wherein the apparatus further comprises one or more demodulators configured to extract the plurality of returned signals from the composite signal at respective emission wavelengths of each of the plurality of illumination sources based on the different respective modulation frequencies at which the plurality of illumination sources are activated.

23. The apparatus of claim 21, wherein the one or more detectors are positioned adjacent to the plurality of illumination sources, wherein the one or more detectors are configured to detect a composite signal from the sample in response to the illumination of the sample, wherein the composite signal comprises a plurality of returned signals, and wherein each of the plurality of returned signals corresponds to light emitted from a respective one of the plurality of illumination sources at the respective emission wavelength, and wherein the apparatus further comprises an analog-to-digital converter (ADC) and digital signal processor (DSP) configured to extract the plurality of returned signals from the composite signal at respective emission wavelengths of the plurality of illumination sources based on the different respective modulation frequencies at which the plurality of illumination sources are activated.

* * * * *